Aug. 9, 1966   J. J. TUCKER   3,265,146
STEERING SYSTEM FOR FOUR-TRACK SNOW VEHICLES
Filed Nov. 3, 1964   2 Sheets-Sheet 1

INVENTOR.
Jasper J. Tucker
BY
Webster & Webster
ATTYS.

United States Patent Office 3,265,146
Patented August 9, 1966

3,265,146
STEERING SYSTEM FOR FOUR-TRACK SNOW VEHICLES
Jasper J. Tucker, Medford, Oreg., assignor to Tucker & Sons, Grass Valley, Calif., a corporation of California
Filed Nov. 3, 1964, Ser. No. 408,490
2 Claims. (Cl. 180—9.46)

This invention relates to endless track, snow traversing vehicles of the type known as "SNO-CATS."

In certain snow covered areas, such as those used for ski runs, airplane landing strips, car parking lots and the like, it is desirable to compact the snow on such areas after a fresh snowfall.

Such compacting can be done by the endless track units of a standard "SNO-CAT," but this is a very slow procedure as it requires a substantial number of passes of the vehicle to compact a given area.

It is, therefore, the major object of this invention to provide a now traversing and compacting vehicle having—in novel combination—both front and rear endless track units mounted for steering movement, each unit including a pair of endless tracks spaced apart transversely, and a steering system connected to the track units arranged so that said units may be disposed in angular of diagonal relation to each other in the same direction relative to the longitudinal plane of the vehicle in what is known as a crabbing position. In connection with this feature, the width of the individual tracks is so related to the transverse space between related tracks that when the track units are disposed in a fully crabbed position, practically the entire area between the opposite outermost tracks will be compacted as the vehicle advances. A much greater area will thus be compacted with each pass than would otherwise be the case, and consequently less passes are required to compact a given area.

A further object of the invention is to include, in the steering system, a means to hold the rear track unit in a normal straight-ahead position when desired, while allowing the front track unit to be steered in the manner of a conventional vehicle.

A further object of the invention is to provide a steering system for four-track snow vehicles which is designed for ease and economy of manufacture.

A still further object of the invention is to provide a practical, reliable, and durable steering system for four-track snow vehicles and one which is exceedingly effective for the purpose for which it is designed.

These objects are accomplished by means of such structure and relative arrangement of parts as will fully appear by a perusal of the following specification and claims.

Figure 1:
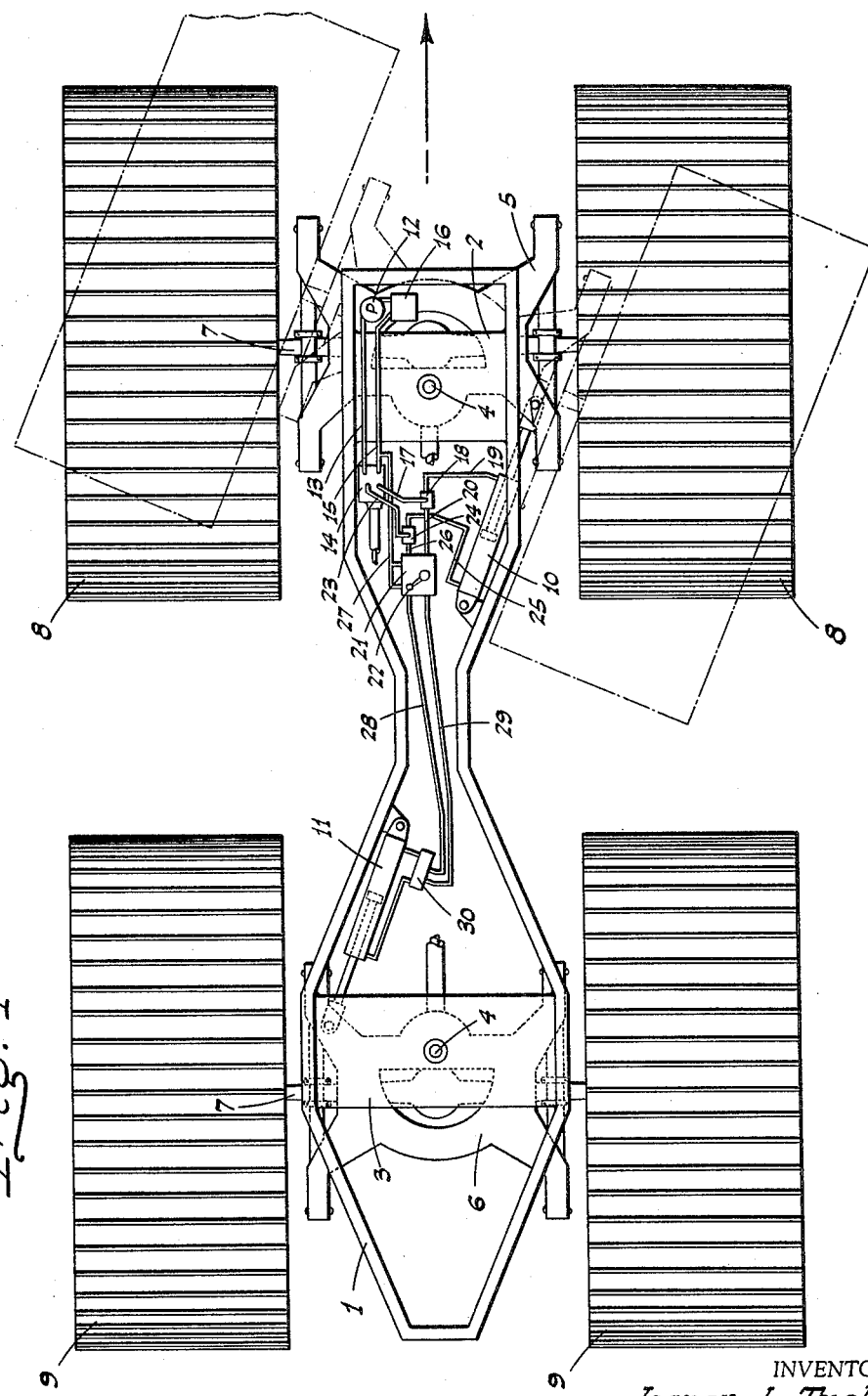
FIG. 1 is a top plan view of the chassis of a four-track snow vehicle; the view showing the improved steering system connected to the track units with the latter—in full lines—in a normal straight-ahead position.

In both these views, the showing generally is somewhat diagrammatic.

Referring now more particularly to the drawings and to the characters of reference marked thereon, the chassis of the snow traversing vehicle to which the novel steering system is applied comprises an elongated horizontal frame 1 of suitable construction, and on which the body (not shown) of the vehicle is mounted. The frame includes front and rear cross members 2 and 3 which support the king pins 4 of front and rear fifth wheels 5 and 6, respectively. The fifth wheels carry the drive axles 7 of the front and rear endless tracks 8 and 9, respectively. The transversely spaced pair of endless tracks 8 form of a front track unit, while the transversely spaced pair of endless tracks 9 form a rear track unit.

Such endless track units are turned or steered about their respective king pins as axes by the following means:

Extending between and connected to the frame 1 and to the front fifth wheel 5 at one side thereof and diagonally relative thereto is a hydraulic ram 10, while a similar ram 11 extends between and is connected to the frame 1 and to the rear fifth wheel 6 on the side of the chassis opposite the ram 10. In the present instance, the ram 10 projects rearwardly from the fifth wheel 5, while the ram 11 projects forwardly from the fifth wheel 6.

Mounted on the chassis is a hydraulic pump 12 from the discharge side of which a conduit 13 leads to a steering wheel actuated steering control device 14 of a standard type and such as is shown for example in United States Patent No. 2,821,171. A return conduit 15 from said device leads to a reservoir 16 from which the pump 12 draws.

A third conduit 17 leads from the steering control device 14 to the inlet of a flow divider 18 of a standard type available on the open market. Another conduit 19 leads from one outlet of the flow divider 18 to the forward end of the ram 10, while a separate conduit 20 from the other outlet of said flow divider 18 leads to one intake of a conventional manually actuated selector valve 21 which as usual is provided with a control handle 22. It will, of course, be understood that both the steering control device 14 and the selector valve 21 are positioned in the driver's compartment of the vehicle where they are handy for manual operation.

A fourth conduit 23 leads from the steering control device 14 to the inlet of another flow divider 24. A conduit 25 leads from the outlet of the flow divider 24 to the rear end of the ram 10, while another conduit 26 from the other outlet of the divider 24 leads to the selector valve 21. A return conduit 27 leads from the selector valve 21 to a connection with the return conduit 15. Other conduits 28 and 29 lead from the selector valve 21 to the front and rear ends, respectively, of the ram 11; an automatically functioning lock valve 30 being interposed in the conduits 28 and 29. This valve is of a standard type manufactured by the Waterman Hydraulics Corp. of Evanston, Illinois, and available on the market as "Waterman Series 271 Lock Valve," such valve being illustrated and described in a brochure numbered "C1" and entitled "Waterman Lock Valves" published by such corporation.

In the operation of the steering system herein shown and described, it is to be understood that the steering control device 14 includes an internal rotary member whose rotation in one direction or the other from a neutral position determines the flow of fluid into one end or the other of the ram 10.

Further, the selector valve 21 includes an internal movable member which when in a neutral position cuts off any flow of fluid to the ram 11 and when moved from such position, allows fluid—which at that time is being fed to ram 10—to be also fed to the same degree to said ram 11.

Additionally, the structure of the lock valve 30 is such that when the selector valve 21 is open to allow fluid to feed into one end or the other of the ram 11, fluid may escape from the opposite end of the ram. If, however, the selector valve 21 is in its neutral position so that fluid is prevented from flowing to the ram 11, the lock valve then functions to prevent fluid already in the ram from leaving the same, and the piston of the ram is locked against movement. This, of course, holds the fifth wheel 6 and the endless track unit associated therewith in a fixed position.

With such functioning of the various valves, the operation of the steering system is specifically as follows:

When the steering control device 14 is in a neutral position, no fluid can flow to either ram, and the fluid as being constantly pumped merely feeds back to the reservoir 16 through conduit 15.

When it is desired to steer the vehicle to the right with the front track unit turned in a corresponding direction as indicated by the dotted lines in FIG. 1, and with the selector valve in its neutral position or closed as far as any flow to the ram 11 is concerned, the steering control device 14 is moved to establish communication between the conduits 13 and 17. This causes fluid to be fed into the forward end portion of the ram 10 through the conduit 19; the ram 10 then decreasing in effective length and turning the fifth wheel 5 to the right. Fluid already in the other end portion of the ram is discharged therefrom through conduits 25 and 23, through the steering control device 14, and thence to the return conduit 15 which leads to the reservoir 16.

When a left steering movement of the front track unit is to be effected, the steering control device 14 is actuated to cause the fluid to be fed to the rear end portion of the ram 10 through conduits 23 and 25 which increases the effective length of ram 10 and turns the fifth wheel 5 to the left. At the same time fluid is discharged from the forward end portion of said ram through conduits 19 and 17, through the steering control device 14, and thence to the return conduit 15 and reservoir.

The equal flow of fluid being fed through the conduits 20 and 26 from the flow dividers 18 and 24, as the steering control device 14 changes the flow from one end portion of the ram to the other, is discharged through the selector valve 21 and to the conduit 27 which leads to connection with the return conduit 15.

Figure 2:
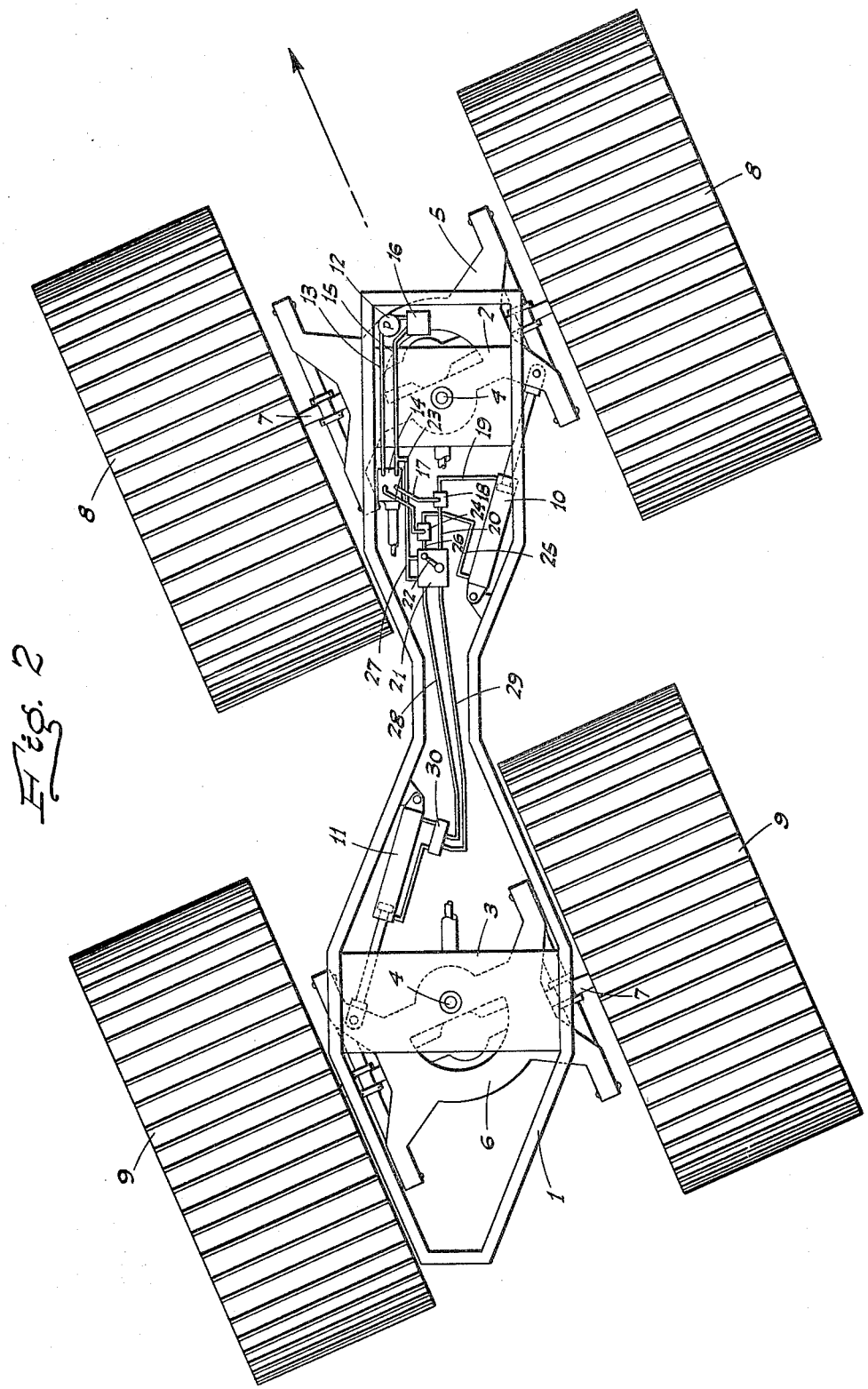
FIG. 2 is a similar view, but showing the track units turned laterally to a crabbing position.

When it is desired to turn both fifth wheels 5 and 6 and the corresponding track units in the same direction simultaneously and to the same extent to a crabbing position, or so that one of the front tracks 8 is alined with the space between the rear tracks 9, while one of the rear tracks 9 is alined with the space between the front tracks 8, all as shown in FIG. 2, the following controlled fluid movement takes place.

At the start, the handle 22 of the selector valve 21 is moved to shift the latter to an open position. The steering control device 14 is then actuated to cause the fluid to be circulated so as to turn the fifth wheel 5 in a selected direction. In this case it is to the left, which causes the front track unit to also be turned to the left, as shown in FIG. 2. This movement will be effected as previously described.

At the same time, due to the open position of the selector valve 21, fluid will be fed to the forward end portion of the ram 11 from the selector valve 21 through conduit 28; this increasing the effective length of ram 11 and turning the rear fifth wheel 6 to the left. The fluid already in the rear end portion of said ram 11 is discharged through conduit 29, selector valve 21, and return conduit 27.

As the rams 10 and 11 are the same size, and as the flow dividers 18 and 24 (through either of which the fluid to both rams must flow) are designed to provide for the feeding of equal volumes of fluid to both rams, the fifth wheels 5 and 6, and the corresponding endless track units, will be swung—in the selected direction—to the same extent.

This extent of movement is such as to dispose the left hand track 8 in a position parallel to and in a transverse plane extending centrally between the rear tracks 9, while the rear right hand track 9 will be disposed in a transverse plane extending centrally between the front tracks 8, as shown.

In connection with the above feature, it will be noted that the chassis as a whole has been designed, with the use of the necessarily wide track units, in such a manner that the width of the spaces between both the front and rear tracks is not materially greater than the width of the tracks themselves. By reason of this fact, when the track units are positioned as shown in FIG. 2, and with the vehicle advancing along a path parallel to the track units, the snow will be packed on a stretch of ground equal in width to the transverse distance between the outer edge of the outermost rear track 9 and the outer edge of the opposite and outermost front track 8.

Should it be desired to steer the vehicle to a certain extent during a snow packing operation and when the track units are in a crabbing position, the selector valve 21 is first returned to its neutral position. The lock valve 30 then functions to prevent any fluid flow from the ram 11 so that the rear track unit remains in its angled position. The steering control device 14 may then be actuated to temporarily steer the front track unit as may be desired, after which said front track unit is returned to its fully angled position.

After a snow packing operation is complete, proper actuation of the steering control device 14 with the selector valve 21 open, enables fluid to be fed to both rams simultaneously to restore both the front and rear track units to their original straight-ahead positions. Upon such positioning of the units having been effected, the selector valve 21 is closed, thereby holding the rear track unit against turning movement.

It should be noted that the front and rear track units are, of course, arranged to be driven by means of a suitable engine (not shown) mounted on the frame 1, and which engine also serves to drive the hydraulic pump 12.

From the foregoing description, it will be readily seen that there has been produced such a steering system for four-track snow vehicles as substantially fulfills the objects of the invention, as set forth herein.

While this specification sets forth in detail the present and preferred construction of the steering system for four-track snow vehicles, still in practice such deviations from such detail may be resorted to as do not form a departure from the spirit of the invention, as defined by the appended claims.

Having thus described the invention, the following is claimed as new and useful and upon which Letters Patent is desired:

1. In a four-track vehicle chassis which includes a frame, front and rear fifth wheels mounted on the frame for rotation about vertical axes, front and rear track units mounted on the corresponding fifth wheels, and a steering system mounted on the chassis and connected to the fifth wheels; the system embodying a hydraulic ram connected between the frame and the front fifth wheel to turn the same, another hydraulic ram connected between the frame and the rear fifth wheel to turn the same, a hydraulic pump on the frame, a manually actuated steering control device, a pressure conduit leading from the pump to the steering control device, a pair of conduits leading from the steering control device and adapted for selective communication with the pressure conduit upon actuation of the said device, separate flow dividers to which the pair of conduits extend, conduits leading from one end of the dividers to the opposite ends of the front ram, conduit units leading from the other end of the dividers to both ends of the rear ram, a manually controlled selector valve interposed in said conduit units, and an automatically functioning locking valve interposed in the conduit units between the rear ram and the selector valve.

2. In a four-track vehicle chassis which includes a frame, front and rear fifth wheels mounted on the frame for rotation about vertical axes, front and rear track units mounted on the corresponding fifth wheels, and a steering system mounted on the chassis and connected to the fifth wheels; said steering system embodying a hydraulic ram connected between the frame and the front fifth wheel to turn the same, another hydraulic ram connected between the frame and the rear fifth wheel to turn the same, a hydraulic pump on the frame, conduits extending between both ends of both rams and the pump, manually actuated means interposed in the conduits to control the flow of hydraulic fluid therethrough to one end or the other of the rams and having a neutral position, manually controlled means normally preventing the flow of such fluid to the rear ram, and a lock valve interposed in the conduits between the rear ram and the last named means and arranged to prevent any fluid flow from the rear ram when the corresponding track unit has been moved to a predetermined position and said manually actuated means is in a neutral position.

References Cited by the Examiner

UNITED STATES PATENTS

| | | | |
|---|---|---|---|
| 1,359,912 | 11/1930 | Oriel | 280—91 |
| 2,374,196 | 4/1945 | Harbers | 180—79.2 |
| 2,878,883 | 3/1959 | France et al. | 180—9.36 |
| 2,966,223 | 12/1960 | Gleasman | 180—50 |
| 3,048,233 | 8/1962 | Crain et al. | 180—79.2 |

FOREIGN PATENTS

| | | |
|---|---|---|
| 1,077,558 | 5/1954 | France. |
| 461,114 | 6/1928 | Germany. |
| 758,398 | 1/1951 | Germany. |
| 928,864 | 6/1955 | Germany. |

A. HARRY LEVY, *Primary Examiner.*